US009561571B2

(12) United States Patent
Wielens et al.

(10) Patent No.: US 9,561,571 B2
(45) Date of Patent: Feb. 7, 2017

(54) METHOD AND DEVICE FOR AIDING IN MANUAL HANDLING OF A WORK PIECE DURING MACHINING

(71) Applicant: Nivora IP B.V., Lochem (NL)

(72) Inventors: Peter Hermanus Gerhardus Wielens, Eibergen (NL); Niels Tielenburg, Zwolle (NL); Alexander Stefan Kok, Goor (NL)

(73) Assignee: Nivora IP B.V., Lochem (NL)

( * ) Notice: Subject to any disclaimer, the term of this patent is extended or adjusted under 35 U.S.C. 154(b) by 489 days.

(21) Appl. No.: 13/653,554

(22) Filed: Oct. 17, 2012

(65) Prior Publication Data

US 2013/0276280 A1 Oct. 24, 2013

(30) Foreign Application Priority Data

Nov. 4, 2011 (EP) .................... 11187849

(51) Int. Cl.
*B23Q 17/22* (2006.01)
*B23Q 17/24* (2006.01)
*G05B 19/4097* (2006.01)

(52) U.S. Cl.
CPC .......... *B23Q 17/2414* (2013.01); *B23Q 17/22* (2013.01); *B23Q 17/2428* (2013.01);
(Continued)

(58) Field of Classification Search
CPC . B23Q 17/2414; B23Q 17/22; B23Q 17/2428; G05B 19/4097; G05B 2219/45143; G05B 2219/32001; G05B 2219/45234; G05B 2219/31048; Y10T 29/53013; Y10T 29/53087; Y10T 29/49764; Y10T 29/49766; Y10T 29/49769; Y10T 29/49771; Y10T 29/49778; Y02P 90/04
(Continued)

(56) References Cited

U.S. PATENT DOCUMENTS 237,196 A * 2/1881 Martinez et al. ................ 4/584
2,949,587 A * 8/1960 Okaya .......................... 333/122
(Continued)

FOREIGN PATENT DOCUMENTS

FR 2949587 * 3/2011 ............ G06F 17/50
FR 2949587 A1 3/2011
(Continued)

OTHER PUBLICATIONS

Aiteanu, D. et al., A Step Forward in Manual Welding: Demonstration of Augmented Reality Helmet, Proceedings of the Second IEEE and ACM International Symposium on Mixed and Augmented Reality (ISMAR), Oct. 7-10, 2003, pp. 309-310, IEEE, Piscataway, NJ.
(Continued)

*Primary Examiner* — Christopher Besler
*Assistant Examiner* — Bayan Salone
(74) *Attorney, Agent, or Firm* — The Webb Law Firm

(57) ABSTRACT

Disclosed is a method for aiding in manual handling of a work piece during machining, which method comprises the steps of: reading a predetermined work plan, comprising a required orientation of the work piece for each machining step of the work plan; detecting the orientation of the work piece; comparing the detected orientation of the work piece with the required orientation; and projecting an indication on the work piece for aiding to manually orient the work piece to the required orientation for the machining step to be performed. Al disclosed is a device for performing the method.

10 Claims, 1 Drawing Sheet

(52) U.S. Cl.
CPC .............. *G05B 19/4097* (2013.01); *G05B 2219/31048* (2013.01); *G05B 2219/32001* (2013.01); *G05B 2219/45143* (2013.01); *G05B 2219/45234* (2013.01); *Y02P 90/04* (2015.11); *Y10T 29/49764* (2015.01); *Y10T 29/49766* (2015.01); *Y10T 29/49769* (2015.01); *Y10T 29/49771* (2015.01); *Y10T 29/49778* (2015.01); *Y10T 29/53013* (2015.01); *Y10T 29/53087* (2015.01)

(58) Field of Classification Search
USPC ...... 29/407.04, 407.01, 407.05, 407.09, 703, 29/720; 73/146, 146.2–146.8; 356/614, 356/615, 620, 622, 314; 700/56, 57
See application file for complete search history.

(56) References Cited

U.S. PATENT DOCUMENTS

| | | | | |
|---|---|---|---|---|
| 3,068,363 | A * | 12/1962 | Samborski | 250/234 |
| 5,148,591 | A * | 9/1992 | Pryor | 29/407.04 |
| 5,388,318 | A * | 2/1995 | Petta | 29/407.04 |
| 5,646,859 | A * | 7/1997 | Petta et al. | 700/95 |
| 5,661,667 | A * | 8/1997 | Rueb et al. | 702/95 |
| 5,663,885 | A * | 9/1997 | Stahl | 700/134 |
| 6,069,700 | A * | 5/2000 | Rudnick et al. | 356/511 |
| 6,317,980 | B2 | 11/2001 | Buck, III | 29/897.31 |
| 6,349,241 | B1 * | 2/2002 | Peron et al. | 700/134 |
| 6,647,868 | B2 * | 11/2003 | Chen | 100/99 |
| 6,769,354 | B2 * | 8/2004 | Chen | 100/35 |
| 6,836,694 | B1 * | 12/2004 | Podubrin | 700/134 |
| 7,241,981 | B2 * | 7/2007 | Hofmann | 250/201.1 |
| 7,426,451 | B2 * | 9/2008 | Binder | 702/150 |
| 7,480,037 | B2 * | 1/2009 | Palmateer et al. | 356/237.1 |
| 7,751,046 | B2 * | 7/2010 | Levy et al. | 356/401 |
| 7,782,361 | B2 * | 8/2010 | Kotake et al. | 348/207.99 |
| 7,961,909 | B2 * | 6/2011 | Mandella et al. | 382/103 |
| 7,986,417 | B2 * | 7/2011 | Rueb et al. | 356/614 |
| 8,070,555 | B2 * | 12/2011 | Hofer | B24B 19/14 451/10 |
| 8,121,717 | B2 * | 2/2012 | Idaka et al. | 700/98 |
| 8,130,385 | B2 * | 3/2012 | Satoh et al. | 356/620 |
| 8,224,024 | B2 * | 7/2012 | Foxlin et al. | 382/103 |
| 8,363,928 | B1 * | 1/2013 | Sharp | 382/154 |
| 8,534,171 | B2 * | 9/2013 | Lin | 82/118 |
| 8,614,740 | B2 * | 12/2013 | Maehner | 348/125 |
| 8,638,984 | B2 * | 1/2014 | Roithmeier | 382/103 |
| 8,639,051 | B2 * | 1/2014 | Delis et al. | 382/264 |
| 8,730,312 | B2 * | 5/2014 | Roebke et al. | 348/61 |
| 8,782,878 | B2 * | 7/2014 | Morden et al. | 29/720 |
| 2001/0004840 | A1 * | 6/2001 | Nagasawa | B21D 5/02 72/14.8 |
| 2003/0045948 | A1 * | 3/2003 | Hwang | G05B 19/40938 700/56 |
| 2005/0232642 | A1 * | 10/2005 | Egner et al. | 398/172 |
| 2005/0256606 | A1 * | 11/2005 | Irri | B21D 5/02 700/213 |
| 2006/0059855 | A1 * | 3/2006 | Goldenberg | G05B 19/4099 52/745.19 |
| 2006/0227211 | A1 * | 10/2006 | Kotake et al. | 348/141 |
| 2006/0259269 | A1 * | 11/2006 | Binder | 702/155 |
| 2007/0081695 | A1 * | 4/2007 | Foxlin et al. | 382/103 |
| 2007/0100492 | A1 * | 5/2007 | Idaka et al. | 700/166 |
| 2008/0121168 | A1 * | 5/2008 | Ryznar | G05B 19/41805 116/201 |
| 2009/0037138 | A1 * | 2/2009 | Behan | B21J 15/14 702/150 |
| 2009/0187276 | A1 * | 7/2009 | Nagatsuka et al. | 700/245 |
| 2010/0030064 | A1 * | 2/2010 | Averbuch | 600/424 |
| 2010/0112899 | A1 * | 5/2010 | Hofer | B24B 19/14 451/5 |
| 2010/0277747 | A1 * | 11/2010 | Rueb et al. | 356/614 |
| 2013/0038633 | A1 * | 2/2013 | Maggiore | 345/633 |
| 2013/0094014 | A1 * | 4/2013 | Nakanishi | 356/51 |

FOREIGN PATENT DOCUMENTS

| | | | | |
|---|---|---|---|---|
| WO | 0237196 | A2 | 5/2002 | |
| WO | WO 0237196 | * | 5/2002 | G05B 19/00 |
| WO | 2007038740 | A2 | 4/2007 | |
| WO | WO 2007038740 | * | 11/2007 | B23Q 15/00 |

OTHER PUBLICATIONS

Iwamoto, K. et al., Plate Bending by Line Heating with Interactive Support through a Monocular Video See-through Head Mounted Display, IEEE International Conference on Systems Man and Cybernetics, Oct. 10, 2010, pp. 185-190, IEEE, Piscataway, NJ.

Liverani, A. et al., A CAD-augmented Reality Integrated Environment for Assembly Sequence Check and Interactive Validation, Concurrent Engineering: Research and Applications, Mar. 2004, pp. 67-77, vol. 12, No. 1.

* cited by examiner

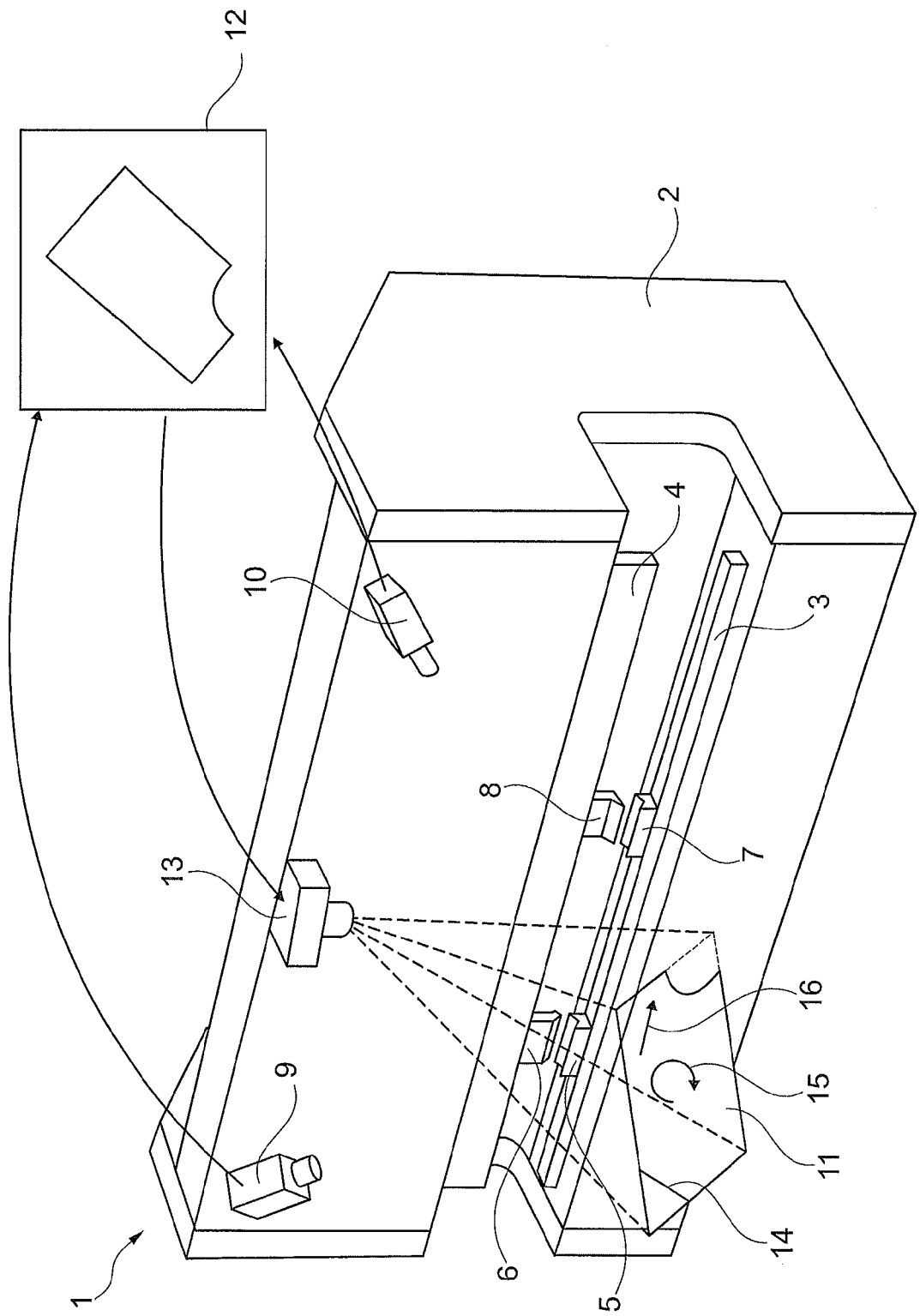

METHOD AND DEVICE FOR AIDING IN MANUAL HANDLING OF A WORK PIECE DURING MACHINING

BACKGROUND OF THE INVENTION

Field of the Invention

Method and device for aiding in manual handling of a work piece during machining The invention relates to a method for aiding in manual handling of a work piece during machining.

Description of Related Art

When using for example a press brake for bending a sheet material, it is sometimes difficult to determine how to orient the work piece to perform the next machining step. A press brake typically is provided with several tools next to each other for performing the different machining steps. A first tool could cause the sheet material to bend upwardly, while a second tool could cause the sheet material to bend downwardly. Such choices are made depending on the intermediate shape of the work piece and the abilities of the tools and restrictions of the press brake.

Orienting the work piece for a next machining step requires spatial awareness of the operator, which sometimes is only obtained after a number of errors made during bending. First of all the correct part of the work piece has to be brought between the tools and secondly the correct side of the work piece has to face upwardly.

It is known to help the operator by showing a graphical representation of the work piece on the control screen of the press brake. This could still result in errors, because the operator could interpret the graphical representation incorrectly. Furthermore the operator has to take his/her eyes of the press brake and look at the control screen, which is undesired.

Similar problems with orienting the work piece can also arise with different types of machines, like for example a drilling machine, a milling machine or a welding machine.

It is an object of the invention to provide a method for aiding in manual handling of a work piece during machining, which reduces the chance on errors during machining of a work piece.

SUMMARY OF THE INVENTION

This object is achieved with a method according to the invention, which method comprises the steps of:
reading a predetermined work plan, comprising a required orientation of the work piece for each machining step of the work plan;
detecting the orientation of the work piece;
comparing the detected orientation of the work piece with the required orientation;
projecting an indication on the work piece for aiding to manually orient the work piece to the required orientation for the machining step to be performed.

According to the method of the invention, the instantaneous orientation of the work piece is detected and compared to the required orientation necessary to perform the next machining step.

The orientation of the work piece is understood to be the position of the work piece relative to an origin and the rotation of the work piece.

For example, when bending a rectangular metal sheet on a press brake, the method according to the invention detects whether for example a short side of the metal sheet is arranged between tools and whether the metal sheet is inserted between the correct tools along the length of the press brake.

If the long side of the metal sheet is to be inserted between the tools, a sign could be projected on the work piece indicating that the work piece should be rotated.

If the work piece is about to be inserted between the wrong tools along the length of the press brake, an indication could be projected on the work piece, that the work piece should me moved towards the correct tools.

So, in a preferred embodiment of the method according to the invention the indication shows the position of the next machining step on the work piece. It is furthermore preferred if the indication shows hints for orienting the work piece to the required orientation for the machining step to be performed.

In still another embodiment of the method according to the invention at least one of the indications is projected on the machine with which the machining step is performed.

By projecting at least one of the indications on the machine itself, it can be indicated at which position the work has to be inserted in to the machine.

On the other hand the indications projected on the machine itself can also be used to indicate which tools should be used in the machine and at which position the tools should be inserted.

In another embodiment of the method according to the invention the machining steps are performed on a press brake. In particular with a press brake it could be difficult to always correctly orient the work piece relative to the press brake, especially when a large number of bends are performed on the work piece.

Preferably the indications are projected on the work piece by a laser.

In yet another embodiment of the method according to the invention the predetermined work plan further comprises a three dimensional model of the work piece for each machining step and wherein the method further comprises detecting the shape of the work piece and comparing the detected shape with the three dimensional model.

By comparing the detected shape of the work piece with the three dimensional model, it is possible to check whether the work piece has the correct shape for the next machining step. Furthermore, with the three dimensional model, it is easier to detect the shape of the work piece and accordingly the orientation of the work piece.

In still another embodiment of the method according to the invention the indication on the work piece is projected by augmented reality. By using augmented reality images can be combined with the real image of an object. Typically, glasses are used, such that a person can look to an object. On the inside of the glasses an image is projected, such that the person will see the combined image of the object and the projected image.

When augmented reality is used also the orientation of the viewer is to be determined, such that the projection of the indication can be calculated correctly for the viewer.

The indications could further comprise messages relevant to the machining process. For example error messages or status information can be projected, such that the operator does not need to look away from the work piece during machining.

The invention also relates to a device for aiding in manual handling of a work piece during machining, comprising:
at least one camera for obtaining an image of the work piece;

a controller for reading a predetermined work plan, comprising a three dimensional model of the work piece for each machining step and a required orientation of the work piece for each machining step of the work plan and for comparing the detected orientation of the work piece with the required orientation;

projecting means for projecting an indication on the work piece for aiding to manually orient the work piece to the required orientation for the machining step to be performed.

Preferably, the device according to the invention comprises at least two camera's spaced apart, to obtain a three dimensional image.

The at least one camera can be mounted to the press brake or near the press brake. Another option is to mount the camera on the operator using the press brake. In this case, the camera could be mounted on glasses, which the operator wears. The advantage is that the camera will have substantially the same view the operator has of the work piece. Also for this embodiment it is necessary to determine the orientation of the camera, as it will move along with the movements of the operator.

BRIEF DESCRIPTION OF THE DRAWING(S)

These and other features will be elucidated in conjunction with the accompanying drawing.

FIG. 1 shows a press brake device in accordance with the present invention.

DESCRIPTION OF THE PREFERRED EMBODIMENT(S)

FIG. 1 shows a press brake 1. This press brake 1 has a frame 2 with a stationary lower beam 3 and a movable upper beam 4. The lower beam 3 and movable upper beam 4 comprise two sets of tools 5, 6 and 7, 8 for performing two separate machining operations.

The press brake 1 has at the top two camera's 9, 10 which capture a three dimensional image of a metal sheet 11. Based on these images an orientation of the metal sheet 11 relative to the press brake can be determined. This orientation is compared in a controller 12 with a required orientation. As a result the controller controls a projector 13 at the top of the press brake 1, to project images on the metal sheet 11.

The controller 12 projects with the projector 13 a virtual bending line 14 to indicate to the operator, which part of the metal sheet 11 should be bent. Furthermore an icon 15 for rotating the metal sheet 11 is shown, telling the operator that the sheet 11 should be rotated for a correct orientation. Also an arrow 16 is shown indicating that the sheet 11 should be moved along the press brake 1 to the tools 7, 8, which are necessary for the current operation.

The projector 13 can also be used to project indications on the lower beam 3 and upper beam 4 to help the operator to prepare the press brake 1 by inserting the tools 5, 6, 7, 8 at the correct position in the beams 3, 4.

The invention claimed is:

1. A method for aiding in manual handling of a work piece during machining, which method comprises the, steps of:
   reading a predetermined work plan, comprising a required orientation of the work piece for each machining step of the work plan;
   detecting an orientation of the work piece to obtain a detected orientation;
   comparing the detected orientation of the work piece with the required orientation; and
   projecting an indication on the work piece for aiding to manually orient the work piece to the required orientation for the machining step to be performed and wherein the indication comprises at least one virtual bending line to indicate to the operator which part of the work piece should be bent, wherein the indication follows the work piece as it moves.

2. The method according to claim 1, wherein the indication further shows the position of the next machining step on the work piece.

3. The method according to claim 1, wherein the indication further shows hints for orienting the work piece to the required orientation for the machining step to be performed.

4. The method according to claim 3, wherein at least one of the indications is projected on the machine with which the machining step is performed.

5. The method according to claim 1, wherein the machining step is performed on a press brake.

6. The method according to claim 1, wherein the indications are projected on the work piece by a laser.

7. The method according to claim 1, wherein the predetermined work plan further comprises a three dimensional model of the work piece for each machining step and wherein the method further comprises detecting the shape of the work piece and comparing the detected shape with the three dimensional model.

8. The method according to claim 1, wherein the indication on the work piece is projected by augmented reality.

9. A method for aiding in manual handling of a work piece during machining, which method comprises the steps of:
   reading a predetermined work plan, comprising a required orientation of the work piece for each machining step of the work plan;
   detecting an orientation of the work piece to obtain a detected orientation;
   comparing the detected orientation of the work piece with the required orientation; and
   projecting an indication on the work piece for aiding to manually orient the work piece to the required orientation for the machining step to be performed, wherein the indication shows translation and/or rotation for moving the work piece to the required orientation for the machining step to be performed and wherein the hints are made up of icons.

10. The method for aiding in manual handling of a work piece during machining in accordance with claim 9, wherein the icons are comprised of an icon for showing how the work piece should be rotated and another icon for showing how the work piece should be translated.

* * * * *